(12) United States Patent
Sulser et al.

(10) Patent No.: US 11,459,017 B2
(45) Date of Patent: Oct. 4, 2022

(54) ENERGY ABSORPTION DEVICE FOR A STEERING COLUMN, STEERING COLUMN AND METHOD FOR OPERATING A STEERING COLUMN

(71) Applicants: thyssenkrupp Presta AG, Eschen (LI); thyssenkrupp AG, Essen (DE)

(72) Inventors: Hansjoerg Sulser, Gamprin (LI); Alexander Wesely, Fishers, IN (US)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 17/056,546

(22) PCT Filed: May 27, 2019

(86) PCT No.: PCT/EP2019/063611
§ 371 (c)(1),
(2) Date: Nov. 18, 2020

(87) PCT Pub. No.: WO2019/228962
PCT Pub. Date: Dec. 5, 2019

(65) Prior Publication Data
US 2021/0206421 A1   Jul. 8, 2021

(30) Foreign Application Priority Data
May 29, 2018 (DE) ............. 10 2018 208 535.8

(51) Int. Cl.
*B62D 1/19* (2006.01)
*F16F 7/12* (2006.01)
*B62D 1/184* (2006.01)

(52) U.S. Cl.
CPC ............. *B62D 1/184* (2013.01); *B62D 1/192* (2013.01); *F16F 7/123* (2013.01); *F16F 7/125* (2013.01); *F16F 7/128* (2013.01)

(58) Field of Classification Search
CPC ........ B62D 1/184; B62D 1/192; B62D 1/195; B62D 1/19; F16F 7/123; F16F 7/125; F16F 7/128; F16F 7/12
(Continued)

(56) References Cited

U.S. PATENT DOCUMENTS 9,663,136 B2   5/2017  Stinebring
10,315,682 B2  6/2019  Agbor et al.
(Continued)

FOREIGN PATENT DOCUMENTS

CN   107531269 A      1/2018
DE   102005028054 B3 * 12/2006 ............. B62D 1/195
(Continued)

OTHER PUBLICATIONS

International Search Report issued in PCT/EP2019/063611, dated Oct. 10, 2019.

*Primary Examiner* — Keith J Frisby
(74) *Attorney, Agent, or Firm* — thysenkrupp North America, LLC (57) ABSTRACT

An energy absorption device for a steering column for a motor vehicle includes an energy absorption element for absorbing energy by a relative movement between at least two components of the steering column in a crash situation, and at least one arresting element for arranging in a blocking position for blocking the relative movement.

16 Claims, 6 Drawing Sheets

(58) Field of Classification Search
USPC .......................................................... 280/777
See application file for complete search history.

(56) References Cited

U.S. PATENT DOCUMENTS

| | | |
|---|---|---|
| 2011/0115206 A1 | 5/2011 | Sulser et al. |
| 2012/0024101 A1* | 2/2012 | Schnitzer ............... B62D 1/195 |
| | | 74/492 |
| 2013/0074641 A1 | 3/2013 | Schnitzer et al. |
| 2016/0121920 A1 | 5/2016 | Klepp |
| 2018/0037250 A1 | 2/2018 | Kreutz et al. |
| 2019/0176870 A1 | 6/2019 | Ganahl |

FOREIGN PATENT DOCUMENTS

| | | |
|---|---|---|
| DE | 10 2008 034 807 B3 | 10/2009 |
| DE | 10 2010 036 894 A1 | 12/2011 |
| DE | 10 2010 044 795 A | 3/2012 |
| DE | 10 2013 104 958 B | 7/2014 |
| DE | 10 2015 204 476 A | 5/2016 |
| DE | 10 2016 214 709 A | 2/2018 |
| DE | 10 2016 220 531 A | 4/2018 |
| JP | 2016113139 A | 6/2016 |

* cited by examiner

ENERGY ABSORPTION DEVICE FOR A STEERING COLUMN, STEERING COLUMN AND METHOD FOR OPERATING A STEERING COLUMN

CROSS REFERENCE TO RELATED APPLICATIONS

This application is a U.S. National Stage Entry of International Patent Application Serial Number PCT/EP2019/063611, filed May 27, 2019, which claims priority to German Patent Application No. DE 10 2018 208 535.8, filed May 29, 2018, the entire contents of both of which are incorporated herein by reference.

FIELD

The present disclosure generally relates to an energy absorption device for a steering column for a motor vehicle, a steering column for a motor vehicle, and a method for operating a steering column for a motor vehicle in a crash situation.

BACKGROUND

Energy absorption devices are frequently used in steering columns in order, in the crash situation, that is to say in the event of a collision of the motor vehicle with another motor vehicle or another object, to degrade in a targeted manner the energy associated with the vehicle driver striking the steering wheel and hence the steering column in such a way that the vehicle driver thrown against the steering wheel is as far as possible not at all injured or is at least injured to the smallest possible degree. Here, the corresponding energy, which is also referred to as crash energy, is substantially absorbed at least in the first energy absorption element, for example by dissipation, if for example the outer casing unit and the inner casing tube in the steering column move toward one another in the crash situation, that is to say a relative movement is carried out in which at least the first energy absorption element is situated in a force flow between the inner casing tube and the outer casing unit.

However, the relative movement and hence the energy absorption, which typically leads to a deliberate and desired defined destruction of the energy absorption element, should not already be carried out when the vehicle driver inputs only an increased axial force into the steering column, for example if the inner casing tube is motor-adjusted relative to the outer casing unit and for example strikes an obstacle in the process. A so-called misuse of the first energy absorption element should thus be avoided. Therefore, energy absorption devices of the type stated at the outset comprise the at least one arresting element, which blocks the execution of the relative movement if it is arranged for example in the blocking position in such a way that at least one of the components of the steering column, in particular the aforementioned inner casing tube and/or the aforementioned outer casing unit, collide with the arresting element during the execution of the relative movement.

This is known from DE 10 2013 104 958 B3, according to which, in a steering column with an energy absorption device, the arresting element is a shear bolt. The previously known shear bolt here prevents the above-described activation of the first energy absorption element in a so-called normal operating case of the steering column, that is to say in particular if no crash situation is present, and the inner casing tube (referred to as casing tube in DE 10 2013 104 958 B3) is loaded only in the axial direction by the vehicle driver. In the crash situation, the shear pin is then sheared off, that is to say destroyed, to allow the execution of the relative movement, wherein the first energy absorption element is situated in a force flow between the inner casing tube and the outer casing unit.

Furthermore, DE 10 2016 214 709 A1 discloses an energy absorption device having a plurality of energy absorption elements, in which device the relative movement between the inner casing tube and the outer casing unit is likewise blocked by a shear bolt, wherein the shear bolt is sheared in the event of a crash to allow the relative movement, with the result that at least one of the energy absorption elements absorbs energy.

Finally, U.S. Pat. No. 9,663,136 B2 discloses an electrically adjustable steering column in which an energy absorption device of the type stated at the outset is connected on the one hand to the outer casing unit via an actuating unit for axially adjusting the inner casing tube and on the other hand to the inner casing tube via fastening bolts. The energy absorption device here again has shear bolts which are sheared in the crash situation such that the inner casing tube and the actuating unit, and hence the outer casing unit, carry out a relative movement in which the energy absorption device absorbs energy by means of an energy absorption element.

However, a disadvantage of the prior art is manifested by the fact that a force peak, which acts on the vehicle driver, occurs in the crash situation upon shearing off of the arresting element, with the result that the driver's body is exposed to undesirably high accelerations (negative accelerations or deceleration).

Thus a need exists for an energy absorption device, a steering column, and a method, which together reduce the loading acting on the vehicle driver in the crash situation.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to an energy absorption device for a steering column for a motor vehicle, comprising at least one first energy absorption element for absorbing energy by a relative movement between at least two components of the steering column in a crash situation, and at least one arresting element for arranging in a blocking position for blocking the relative movement.

Furthermore, the present invention relates to a steering column for a motor vehicle, comprising an inner casing tube, in which a steering spindle is rotatably mounted, and an outer casing unit, in which the inner casing tube is held, wherein the inner casing tube and the outer casing unit are arranged to carry out a relative movement.

Finally, the present invention relates to a method for operating a steering column for a motor vehicle in a crash situation and thus to a method for energy absorption in a steering column in a crash situation.

In some example energy absorption devices, the first arresting element is movable from the blocking position into a release position to allow the relative movement. This advantageously allows the first arresting element to be arranged, in the crash situation, outside of a force flow between the components of the steering column, specifically by said element being moved into the release position. That is to say that, in the crash situation, the energy is absorbed at least by the first energy absorption element without energy absorption being caused in the first arresting element within the sense of the invention. In an advantageous manner, the first arresting element can then be selected in terms of its material or material combinations and/or its shape in such a way that optimal blocking of the relative movement is realized. In particular, it can be produced from a high-strength material and/or, in the case of a configuration as a bolt, pin or the like, have a relatively large diameter. The first arresting element can therefore be dimensioned independently of the crash situation. This is particularly advantageous if the energy absorption device according to the invention is used in an axially adjustable, in particular motor-adjustable, steering column, to be precise if the energy absorption device is arranged there such that it is operatively connected on one side to an actuating unit for axially adjusting the inner casing tube or the steering spindle, that is to say to the first component (the steering spindle is here rotatably mounted in the inner casing tube), and is operatively connected on another side to the outer casing tube, that is to say to the second component. An operative connection is to be understood as meaning that they are in the force flow with one another, that is to say either directly or indirectly coupled to one another. Here, for example, the first arresting element engages, in a first engagement portion, into an opening and/or cutout of the inner casing tube and/or into an opening and/or cutout of the first energy absorption element, and, in a second engagement portion, into an opening and/or cutout of the outer casing unit and/or into a cutout or opening of a deformation member which deforms the first energy absorption element in the crash situation, with the result that, in particular upon axial loading of the steering spindle and/or of the inner casing tube, the first arresting element is arranged between these components for the purpose of blocking a relative movement. The first arresting element is thus situated in the blocking position, that is to say that, because of the blocked relative movement, the first energy absorption element is not activated for energy absorption; no or substantially no energy absorption occurs there when the first arresting element is arranged in the blocking position.

In particular, the first arresting element can interact with an arresting device, in particular a clamping device, incorporated by the outer casing unit, wherein the arresting device allows the relative movement in a released state (for example, a force-fitting and/or form-fitting connection between the inner casing tube and the outer casing unit is released), with the result that the inner casing tube can be displaced into a desired position axially, for example manually by the vehicle driver. The relative movement is thus precisely not allowed in a crash situation, but rather in an operating situation of the steering column in normal operation serving for operating comfort or the like. If, by contrast, the arresting device is situated in an arrested state, the relative movement is blocked according to the invention via the first arresting element (for example, a force-fitting and/or form-fitting connection between the inner casing tube and the outer casing unit is brought about by the arresting device, wherein the first arresting element, which is then situated in the blocking position, is arranged in a corresponding force flow upon axial loading of the steering column). In summary, it can be stated that, in normal operation, the arresting element is situated in the blocking position and, in the crash situation, that is to say upon occurrence of a crash situation, is transferred into the release position, with the result that the first energy absorption element is then deformed by virtue of the relative movement between the two components, in this case the inner casing tube and the outer casing tube.

In addition, there can be provided a bracket which can be connected to the motor vehicle and on which the outer casing tube is mounted so as to be pivotable about a pivot axis. A height adjustment can thus be realized in that, in the released state of the arresting device, the outer casing tube is pivotable with respect to the bracket. In the arrested state of the arresting device, the outer casing tube is fixed with respect to the bracket, and the inner casing tube is simultaneously fixed with respect to the outer casing tube.

Alternatively or additionally, the first arresting element can interact with a motor-driven adjusting unit incorporated by the outer casing unit, wherein, in a driven state, the adjusting unit displaces the inner casing tube axially with respect to the outer casing unit, with the result that the inner casing tube can be motor-displaced into a desired position. If the adjusting unit is in a driven state for setting the desired position and the steering column is in normal operation, that is to say in a crash situation, the relative movement is blocked according to the invention via the first arresting element. The force flow during the adjustment of the inner casing tube with respect to the outer casing tube occurs via the arresting element, with the result that an undesired deformation of the first energy absorption element is avoided by virtue of the solution according to the invention. If the adjusting unit is in a nondriven state and the steering column is in normal operation, that is to say not in a crash situation, the relative movement is blocked according to the invention via the first arresting element (for example in that the adjusting unit in the nondriven state is arrested with respect to the relative movement, with the result that the adjusting unit and hence the outer casing unit are in a force flow with the inner casing tube upon axial loading of the steering column, wherein the first arresting element, which is then situated in the blocking position, is arranged in this force flow). If a crash situation occurs, the arresting element is transferred from the blocking position into the release position, with the result that the first energy absorption element is then deformed as a result of the relative movement between the two components, in this case the inner casing tube and the outer casing tube.

The blocking or the blocking position particularly avoids an energy absorption in the first energy absorption element caused without the invention by the axial loading during the adjustment of the steering spindle and/or otherwise by the vehicle driver in normal operation (normal mode) of the steering column if the first energy absorption element is operatively connected to the inner casing tube and the outer casing unit, for example there via the aforementioned arresting device and/or actuating unit.

If the first arresting element is moved from the blocking position into the release position, the aforementioned first engagement portion of the first arresting element is situated for example outside the aforementioned opening of the inner casing tube and/or of the first energy absorption element and/or of the deformation member. For example, the first arresting element is then arranged, in the region of the first engagement portion, in a part of the aforementioned arresting device and/or of the aforementioned actuating unit. This advantageously ensures that, in the crash situation, the energy absorption is absorbed by previously nonactivated and thus fully functional energy absorption elements or by at least the first energy absorption element without a force peak with a negative action on the health of the driver occurring at the start of the energy absorption. The energy absorption is thus for example located completely or virtually completely in the first energy absorption element in that the arresting element is situated outside of the force flow between for example the inner casing tube, the first energy absorption element and the outer casing unit; the aforementioned arresting device and/or actuating unit incorporated by the outer casing unit can also be situated in the force flow.

It is expressly pointed out at this point that, in the blocking position, the first arresting element can be directly connected to the energy absorption element, for example if it is directly in engagement with the first energy absorption element in the aforementioned first engagement portion, there in particular via the aforementioned opening and/or cutout of the first energy absorption element, or alternatively that, in the blocking position, the first arresting element is arranged outside of the first energy absorption element, for example in that it is only in engagement with the inner casing tube in the first engagement portion, there in particular via the aforementioned opening and/or cutout of the inner casing tube.

It is further expressly pointed out at this point that the energy absorption device according to the invention can also comprise second, third, fourth, fifth, etc., arresting elements and/or second, third, fourth, fifth, etc., energy absorption elements which are each configured within the sense of the invention like the first arresting element or the first energy absorption element.

According to a preferred embodiment of the energy absorption device according to the invention, in the blocking position, the first arresting element has a blocking structure and, in the release position, a release structure, wherein the release structure and the blocking structure are identical. This means in particular that, during the execution of the relative movement, the arresting element is not destroyed by the components of the steering column, in particular that no breakage of the arresting element takes place. The release structure or the blocking structure can here in particular be a volume-filling three-dimensional structure of the first arresting element that, according to the invention, is identical, in particular of the same type, with respect to the release structure and the blocking structure. However, the release structure and the blocking structure are in particular not identical when the first arresting element is destroyed by the relative movement of the components, that is to say in particular deformed and/or broken into two or more fragments. The fact that the release structure and the blocking structure are identical, in particular of the same type, is advantageous because the occurrence of the aforementioned force peak is thereby completely avoided since the first arresting element consequently, and according to the invention, does not contribute to the energy absorption.

In a further advantageous embodiment of the energy absorption device according to the invention, it comprises a drive for moving the first arresting element from the blocking position into the release position. This is advantageous because the drive improves the operability of the first arresting element with respect to the movement into the release position.

In one embodiment which is improved in relation thereto, the drive comprises a pyroelectric propellant charge. By virtue of the pyroelectric propellant charge being ignited, it is possible by means of the drive for example for the resultant explosive force to be transmitted to the first arresting element in such a way that it is moved from the blocking position into the release position by the explosive force. On account of the explosion of the pyroelectric propellant charge, the drive therefore advantageously ensures a relatively quick movement, in the order of magnitude of milliseconds or less, of the first arresting element from the blocking position into the release position, with the result that accompanying this the crash energy can be correspondingly quickly absorbed, to the benefit of the safety for the vehicle driver, by the first energy absorption element which is then situated in the crash situation in operative connection, that is to say in the force flow, between the relatively moving components of the steering column. In other words, there is provided a quick switchover between the blocking of the relative movement for the operating comfort and the enabling of the relative movement for the safety of the vehicle driver.

In an alternative embodiment, the drive comprises a magnetic actuator, in particular lifting magnet. The first arresting element is thus then for example moved by an electromagnet into the release position, whereby the movement of the first arresting element can advantageously be controlled more precisely, for example by an electric circuit. In other words, there is provided a quick and precise switchover between the blocking of the relative movement for the operating comfort and the enabling of the relative movement for the safety of the vehicle driver.

In a still further improved embodiment, the drive is configured to move the first arresting element in dependence on the crash situation and/or an event correlating with the crash situation. This is advantageous because the relative movement and hence the energy absorption is allowed or activated only if the crash situation, for example a collision with another vehicle or another object, or an event correlating with the crash situation, such as for example the activation, in particular ignition, of an airbag, occurs, whereas otherwise, that is to say in a normal operating state, that is to say not a crash situation, but only an increased axial load introduced by the vehicle driver during the operation of the steering column, the execution of the relative movement is blocked in a reliable manner with advantage for the operating comfort. Accordingly, the drive is provided for example with a signal from a crash system of the vehicle on the basis of which the drive moves the first arresting element.

According to a preferred embodiment of the energy absorption device according to the invention, it comprises at least one first deformation element for deforming the first energy absorption element by plastic deformation. The deformation element thus has a deformation member. The deformation element then has for example a greater hardness and/or strength than the energy absorption element, at least with respect to a corresponding contact region of the energy absorption element. A synergy effect with the first arresting element occurs here because a once produced plastic deformation by the deformation element gives rise to a hardening of the energy absorption element and hence to a reduction in the amount of absorbed energy, with the result that the blocking of the relative movement by the first arresting element in the aforementioned normal operating state of the steering column and the enabling of the relative movement and hence of the plastic deformation by the first deformation element only in the crash situation and/or upon the occurrence of an event correlating therewith is particularly advantageous.

In the mounted state of the energy absorption device according to the invention, the first deformation element can be arranged for example on the side of the aforementioned inner casing tube or on the side of the aforementioned outer casing unit, in particular there at the position of a part of the aforementioned arresting device and/or a part of the adjusting unit. Accordingly, the first energy absorption element can in each case be arranged oppositely on the side of the aforementioned outer casing unit. Furthermore, in the case of two or more deformation elements and a corresponding number of energy absorption elements, it is possible, during the execution of the relative movement, that is to say in the crash situation, when the first arresting element is arranged in the release position, for the deformation elements with the energy absorption elements to be selectively brought into engagement with one another, and then preferably in pairs, with the result that, depending on the number of the deformation elements and energy absorption elements in engagement, different energy levels are provided with respect to the total energy absorbed during the execution of the relative movement. At least the first deformation element is preferably in permanent engagement with one of the energy absorption elements. It is thus particularly advantageous if at least one second energy absorption element is incorporated by the energy absorption device according to the invention and, by means of a coupling device, can be coupled into and/or out of the force flow between the inner casing tube and the outer casing unit in order thereby to be able to switch over at least between two energy absorption levels in the crash situation if the first arresting element is arranged in the release position.

Moreover, it is advantageous if the first energy absorption element comprises a cutout, which extends substantially parallel to the direction of the relative movement, for engagement with the deformation element along a cutout surface of the cutout. The cutout can be for example an oblong hole, wherein, during the execution of the relative movement, the deformation element provides a widening of the oblong hole substantially transversely with respect to the direction of the relative movement. Furthermore, it is advantageous if the first deformation element comprises at least one deformation channel for engagement with the first energy absorption element along a channel surface of the deformation channel, wherein, in this case, the first energy absorption element is preferably configured as a strip, in particular as a rail, which preferably has a portion which is spaced apart in the radial direction from the inner casing tube with respect to an outer lateral surface of the inner casing tube and in which, during the execution of the relative movement, the plastic deformation is localized by the engagement of the first deformation element.

Furthermore, it is advantageous if the first energy absorption element comprises a bending element for bending around at least one bending axis transversely with respect to the direction of the relative movement, wherein the bending-around is provided in particular by an engagement of the deformation element (deformation member) with the bending element during the execution of the relative movement. Furthermore, it is advantageous if the first energy absorption element comprises a bending wire and/or a bending strip and/or a bending tear tab.

The object is achieved with regard to the steering column by virtue of the fact that it comprises at least one energy absorption device as claimed in one of the appended claims and/or according to one of the embodiments disclosed here, wherein the first component comprises the outer casing unit, and the second component comprises the inner casing tube, wherein the energy absorption device is operatively connected to the outer casing unit, and is operatively connected to the inner casing tube. In the steering column according to the invention, the energy absorption device according to the invention is thus for example arranged between the inner casing tube and the outer casing unit, with the result that the first energy absorption element is situated in a force flow between these two components when the relative movement is executed by the arrangement of the first arresting element in the release position in the crash situation. Furthermore, the relative movement is blocked if for example the first arresting element engages, in the aforementioned first engagement portion, into an opening and/or cutout of the inner casing tube and/or of the first energy absorption element and/or of the deformation member, and, in the aforementioned second engagement portion, engages into an opening and/or cutout of the outer casing unit, there for example into an opening of the arresting device and/or opening of the adjusting unit, that is to say the arresting element is arranged in the blocking position. Furthermore, for example, the execution of the relative movement is allowed when the first arresting element is arranged, in the aforementioned first engagement portion, only in the outer casing unit, there in particular in the aforementioned arresting device and/or adjusting unit, that is to say when the first arresting element is arranged in the release position. Furthermore, in the steering column according to the invention, the energy absorption device according to the invention is for example operatively connected to the inner casing tube via the first energy absorption element and/or connected to the outer casing unit via the aforementioned arresting device and/or adjusting unit and/or via the deformation element according to the aforementioned embodiments. In other words, the outer casing unit of the steering column according to the invention can alternatively or additionally comprise the aforementioned arresting device and/or adjusting unit, with the result that an adjustable steering column is provided in an advantageous manner. In light of the foregoing, the steering column according to the invention is advantageous because the inner casing tube or the steering spindle in the normal operating state, that is to say for example during the steering with the steering spindle, the execution of the relative movement between the inner casing tube and the outer casing unit is blocked, whereas, in the crash situation and/or in the case of an event correlating therewith, the execution of the relative movement is allowed for energy absorption via the first energy absorption element. In other words, the operating comfort and the safety of the steering column—two normally contradictory factors—are surprisingly simultaneously improved.

Finally, the object is achieved with regard to the method for operating a steering column for a motor vehicle in a crash situation by the fact that at least the following method steps are carried out: a) detecting whether a crash situation and/or a crash event correlating with the crash situation are or is present, b) if the crash situation and/or the crash event are or is not detected, locking a relative movement between at least two components of the steering column, c) if the crash situation and/or the crash event are or is detected, allowing the relative movement, d) absorbing a crash energy, which occurs in the crash situation, in step c). It is thus detected in step a) whether a crash situation has occurred, for example a collision with another vehicle or another object, and/or whether an event correlating therewith, for example the triggering/activation of an airbag, in particular the ignition of the airbag, has occurred. If this is not the case, a normal operating state is present, with the result that, in step b), the relative movement between the components, for example two components, in particular the aforementioned inner casing tube (first component) and the aforementioned outer casing unit (second component), is blocked with advantage for the operating comfort. If, by contrast, the crash situation and/or the event correlating therewith are or is detected, the relative movement is allowed in step c), with the result that, according to step d), crash energy is here absorbed with advantage for the safety.

According to a preferred embodiment of the method according to the invention, in step b), an arresting element is held in a blocking position blocking the relative movement and, in step c), the arresting element is moved into a release position allowing the relative movement. An advantage thereof is that it is possible to switch discretely between the blocking of the relative movement, that is to say the situation which provides the desired operating comfort, and the enabling of the relative movement, that is to say the situation which provides the desired safety in the crash situation, with the result that the occurrence of an undesired force peak during the energy absorption is avoided.

According to an embodiment of the method according to the invention that is improved in relation thereto, in step c), the arresting element is moved into the release position. An advantage thereof is that, in steps c) and d), the energy absorption occurs without a destruction of the arresting element by collision with the components of the steering column, with the result that the occurrence of the undesired force peak during the energy absorption is thereby completely or virtually completely avoided.

According to a preferred embodiment of the method according to the invention, in step c), the relative movement is allowed after a predetermined time period has elapsed. Step c) is thus not carried out directly after step a) or the detection of the crash event or of the event correlating therewith, but only after expiry of the time period, calculated from the detection, that is to say for example the ignition, of an airbag. The airbag can thus deploy at first to a certain degree in the crash situation before the energy absorption occurs by enabling the relative movement, thereby additionally increasing the safety for the vehicle driver in the crash situation.

According to a preferred embodiment of the method according to the invention, in step d), at least one energy absorption element is plastically deformed. This is advantageous because a particularly high energy absorption is thereby provided with advantage for the safety of the vehicle driver.

The method according to the invention is still further improved if, in step c), a pyroelectric propellant charge is ignited. An advantage thereof is that the relative movement and hence the energy absorption is provided particularly quickly, particularly by the pyroelectric propellant charge providing the movement energy for the arresting element, with the result that, in step c), optionally directly after the detection in step a) or after the expiry of a predetermined time period, beginning with the detection in step a), for example the ignition of an airbag, the arresting element is moved into the release position when the crash situation and/or an event correlating therewith are or is detected.

In an alternative manner, the method according to the invention is improved if, in step c), a magnetic force, in particular of a lifting magnet, is activated. This is advantageous because a precise control of the enabling of the relative movement is ensured, for example in that an electromagnet, in the state with current flowing around it, provides the movement energy for the arresting element, with the result that, in step c), optionally directly after the detection in step a) or after the expiry of a predetermined time period, beginning with the detection in step a), for example the ignition of an airbag, the arresting element is moved into the release position when the crash situation and/or an event correlating therewith is or are detected.

Figure 1:
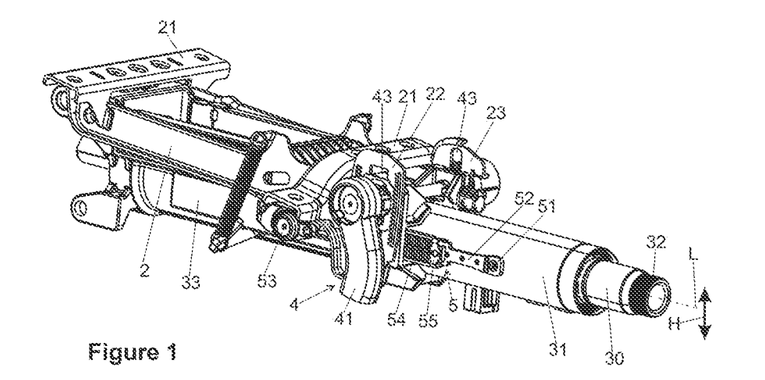
FIG. 1 is a perspective view of the steering column having an inner casing tube, an outer casing unit and an arresting device and also having the energy absorption device.

FIG. 1 schematically illustrates a steering column 1 according to the invention in a perspective view obliquely from behind (with respect to the direction of travel of a motor vehicle, which is not shown). The steering column 1 can be fastened to the body of a motor vehicle (not shown) by means of a multipart bracket 2 designed as a welded component. The bracket 2 comprises fastening means 21 for connection to the body. Furthermore, side cheeks 22 and 23 extend from the bracket 2. A steering spindle 30 is mounted in an inner casing tube 31 so as to be rotatable about the longitudinal axis L, wherein a steering wheel (not shown) can be fitted to the steering spindle 30 at the rear end 32. The front end of the steering spindle 30 can be connected to a universal joint (not shown) of a steering shaft which can be connected to an output shaft of a steering mechanism (not shown). The inner casing tube 31 is held in a receptacle of an outer casing unit 33, the receptacle being continuous in the longitudinal direction L.

An arresting device 4 of the steering column 1 can be selectively brought into a fixed position (locking position, closed state) or release position (open state) by manual actuation of a clamping lever 41. Here, in the release position, the inner casing tube 31 is telescopically displaceable within the outer casing unit 33 for longitudinal adjustment in the direction of the longitudinal axis L, and the outer casing unit 33 is adjustable up and down in the height direction H relative to the bracket 2 in the arrow directions. In the fixing position, both the inner casing tube 31 is fixed in the longitudinal direction, that is to say in the direction of the longitudinal axis L, and the outer casing unit 33 is fixed in the height direction H. The fixing position corresponds to the normal operation of the steering column 1 in which it is ensured that the set steering wheel position is not changed under the forces customarily acting on the steering spindle 30 via the steering wheel.

The arresting device 4 comprises a clamping bolt 42 which is connected to the clamping lever 41 in a rotationally locked manner and which is guided transversely with respect to the longitudinal axis L through oblong holes 43 in the mutually opposite side cheeks 22, 23. The two side cheeks 22 and 23 are moved with respect to one another by way of a clamping mechanism known per se during a rotation of the clamping bolt 42, and the region of the outer casing unit 33 arranged between said cheeks is securely clamped in a force-fitting manner. During the described bracing of the side cheeks 22, 23 of the bracket 2, the outer casing unit 33 is thus compressed transversely with respect to the longitudinal axis L, with the result that the fixing position is set, with the inner casing tube 31 being securely clamped in the outer casing unit 33 in a force-fitting manner. The clamping mechanism can preferably have two lifting disks 411, 412 which are rotated with respect to one another by means of the clamping lever 41. The first lifting disk 411 is connected to the clamping lever 41 in a rotationally locked manner and is designed as a cam disk. The second lifting disk 412 is designed as a link disk and has a slideway on which the first lifting disk 411 slides. The second lifting disk 412 is held on the bracket 2 in a rotationally locked manner. In addition, rolling bodies in the form of balls or rollers can also be arranged between the lifting disks.

Alternatively, there can be arranged between the lifting disks at least two tilt pins which can be moved back and forth between an extended position and an inclined position by the rotation of the lifting disks with respect to one another. Such a clamping mechanism is also referred to as a tilt-pin clamping system.

An energy absorption device 5 is arranged between the inner casing tube 31 and the outer casing unit 33. The energy absorption device 5 comprises a deformation rail 52 via which it is fastened to the inner casing tube 31 by fastening means 51. Furthermore, the energy absorption device 5 comprises a pyroelectric switch 53, that is to say a device which comprises a pyroelectric propellant charge, which upon ignition sets a movement mechanism (not shown in further detail) in operation, and an engagement part 54 which is connected to the deformation rail 52 by a clamp 55 designed as a hold-down means.

Figure 2:
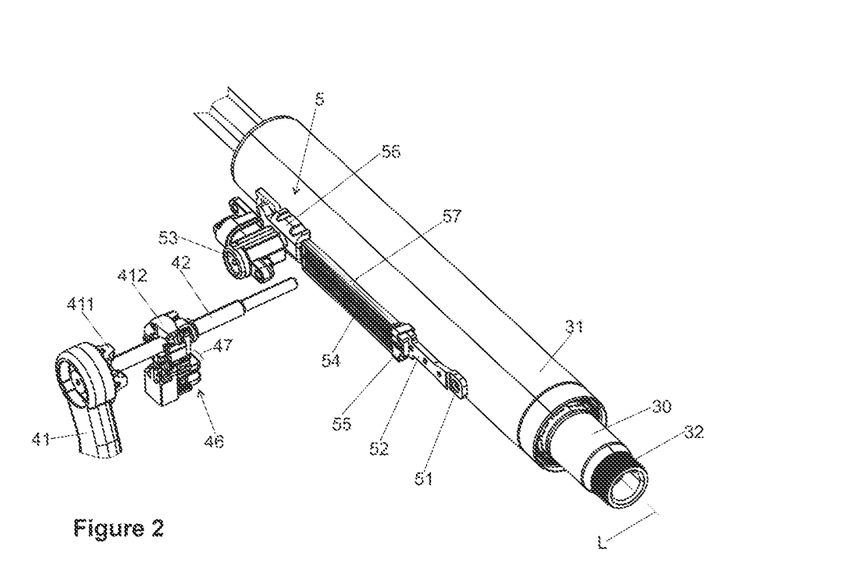
FIG. 2 is a perspective detail view of the inner casing tube with a part of the arresting device and of the energy absorption device of the steering column, each as per FIG. 1.

The perspective detail view of the inner casing tube 31 and of the energy absorption device 5 according to FIG. 2 reveals that the energy absorption device 5 further comprises a deformation member 56 which is in engagement with the deformation rail 52 and is connected to the engagement part 54. If the arresting device 4 is brought into the fixing position as described above by rotating the clamping bolt 42, an arresting part 46 of the arresting device 4 is pressed at the same time via a toothed portion 47 against a toothed portion 57 of the engagement part 54 of the energy absorption device 5, as a result of which the toothings of the portions 47 and 57 are held in form-fitting engagement. By virtue of the inter-engaging teeth running transversely with respect to the longitudinal axis L, the arresting part 46 and the deformation member 56 are connected to one another in a form-fitting manner in the fixing position in the longitudinal direction L via the engagement part 54.

Figure 3:
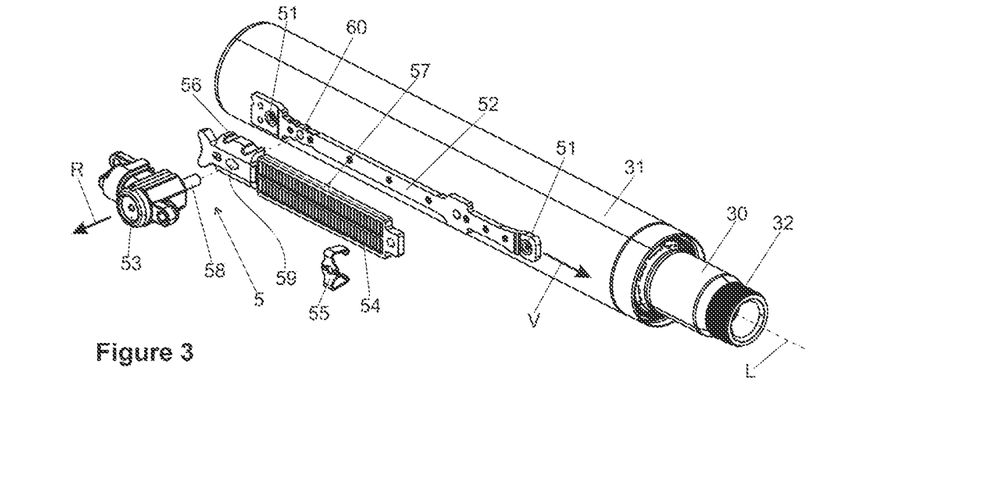
FIG. 3 is an exploded perspective view of the energy absorption device and the inner casing tube, each as per FIG. 2.
Figure 4:
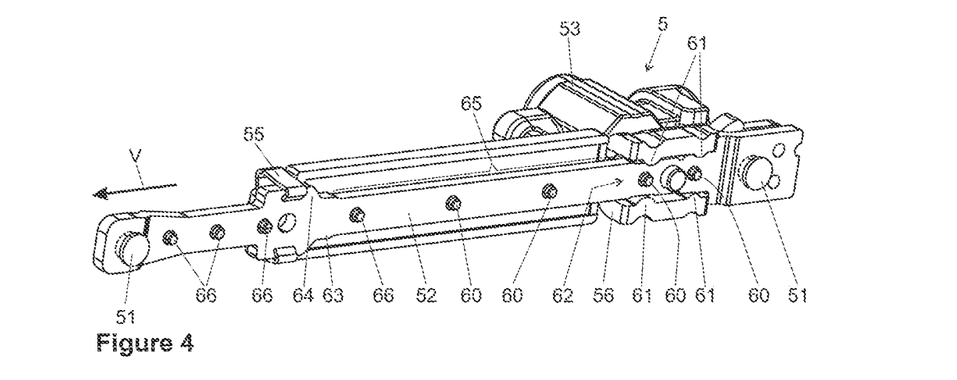
FIG. 4 is a perspective view of the energy absorption device as per FIG. 2 obliquely from the rear right.

The detail illustrations of FIG. 3 and FIG. 4 also reveal that the pyroelectric switch 53 of the energy absorption device 5 comprises a blocking bolt 58 which, upon actuation of the pyroelectric switch 53, that is to say an ignition of a propellant charge incorporated thereby, is moved from a blocking position, in which the blocking bolt 58 engages into an opening 59 of the deformation member 56 and into an opening 60 of the deformation rail 52, outwardly in the direction R in the radial direction with respect to the inner casing tube 31 into a release position. In the release position, the blocking bolt 58 is arranged only still in the opening 59, but no longer in the opening 60. Consequently, in the fixing position of the arresting device 4, the relative movement of the inner casing tube 31, which is fixedly connected to the deformation rail 52, with respect to the outer casing unit 33, which is coupled to the deformation member 56, is no longer blocked by the blocking bolt 58, with the result that the deformation member 56 together with the inner casing tube 31 slides in the direction V along the deformation rail 52 into the outer casing unit 33 if the pyroelectric switch has been actuated.

It becomes clear in FIG. 4 that the deformation rail 52 is then plastically deformed by the movement of the deformation member 56 in the direction V and thus absorbs energy because the deformation member 53 has mutually opposite bulges 61 in a channel 62, wherein the bulges 61 first engage into corresponding cutouts of the deformation rail 52. In a direction of view along the direction V, it is clear that the dimension of the deformation rail 52 transversely with respect to the direction V is greater than the inner dimension of the channel 62 defined by the bulges, with the result that the deformation rail 52 is plastically deformed by the deformation member 56 during a movement in the direction V beginning in the aforementioned cutouts of the deformation rail 52, because the deformation member 56 has, in the region of the channel 62, a higher strength than the deformation rail 52. As viewed from the starting position of the deformation member 56 shown in FIG. 4, the aforementioned dimension of the deformation rail 52 increases at the end of the predetermined deformation path 65 in wedge-shaped portions 63 and 64 in a stepwise manner from the portion 63 to the portion 64, such that a further movement of the deformation member 56 along the direction V is correspondingly inhibited in a stepwise manner. During the execution of the described movement of the deformation member 56, the clamp 55, by way of the engagement part 54 concomitantly moved with the deformation member 56, is pushed away by overcoming a clamping force prevailing between the clamp 55 and the deformation rail 52.

It is clear in the illustration in FIG. 4 that the deformation rail 52 is curved between the fastening means 51 in the direction R, with the result that the deformation travel 65 runs parallel to the axis L in the fastened state of the deformation rail 52 on the inner casing tube 31, with the result that the channel 62 of the deformation member 56 partially encloses the deformation rail 52 in the region of the deformation path 65 as illustrated. For this purpose, the deformation rail 52 has projections 66 which stabilize the deformation rail 52 during the execution of the described deformation movement in the direction V in the direction R, with the result that a deformation of the deformation rail 52 in the direction R and/or in an opposite direction is avoided or at least impeded. The projections 66 additionally stabilize the deformation rail 54 in the direction R with respect to a clamping force introduced by the arresting device 4 via the arresting part 46. The projections 66 and the deformation rail 52 are preferably a one-piece integral component.

Figure 5:
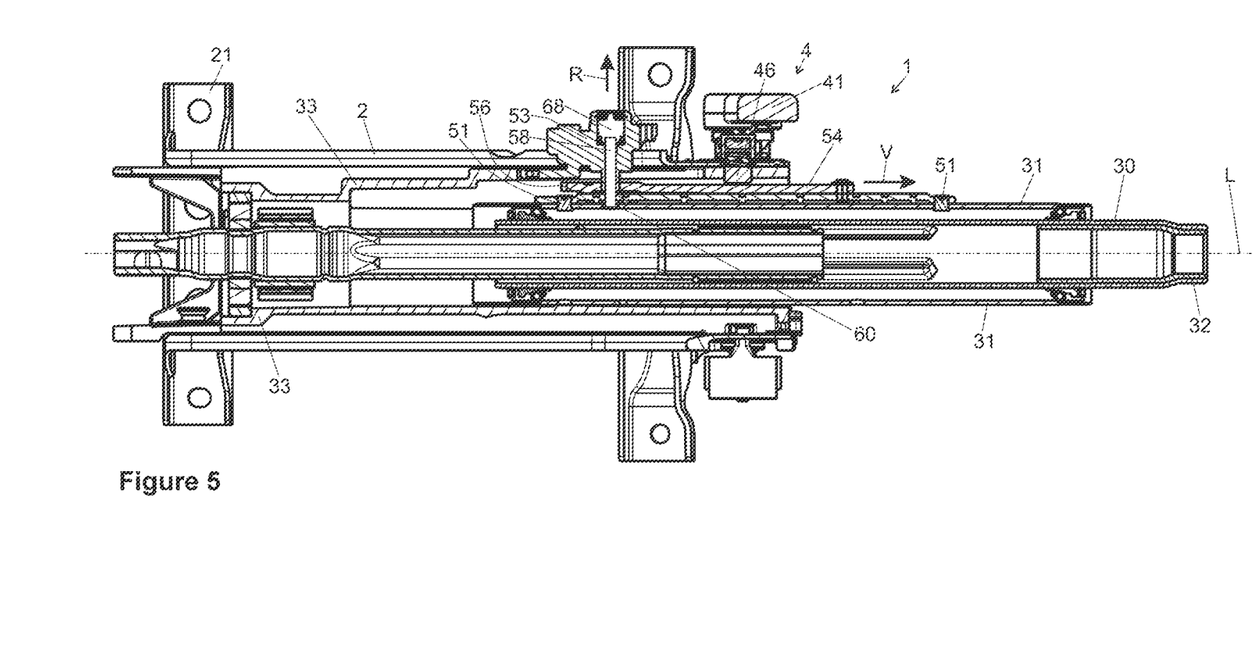
FIG. 5 is a longitudinal sectional view of the steering column as per FIG. 1.
Figure 6:
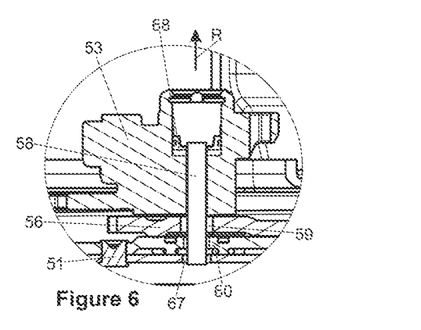
FIG. 6 is an enlarged detail view in longitudinal section of the arresting element and of the drive of the energy absorption device as per FIG. 5, wherein the arresting element is arranged here in the blocking position for blocking the relative movement between the inner casing tube and the outer casing unit.

It is clear from the sectional illustration of the steering column 1 in FIG. 5 with the aid of the detail illustration of FIG. 6 that the blocking bolt 58 blocks the relative movement between the inner casing tube 31 and the outer casing unit 33 in addition to the clamping force applied by the arresting device 4 if the arresting device 4 is clamped as described above in such a way that the arresting part 46 engages into the engagement part 54 by the blocking bolt 58 being arranged, in the blocking position shown, in the openings 59 and 60 and, as illustrated in FIG. 5, in an opening 67 of the inner casing tube 31.

Figure 7:
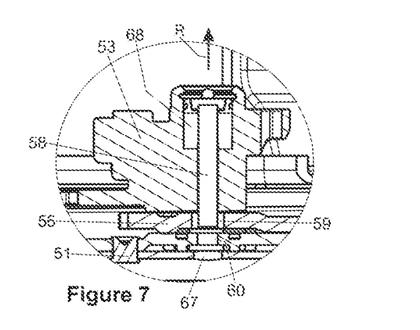
FIG. 7 is an enlarged detail view in longitudinal section of the arresting element and of the drive of the energy absorption device as per FIG. 5, wherein here, unlike in the illustration in FIG. 5 or 6, the arresting element is arranged in the release position to allow the relative movement between the inner casing tube and the outer casing unit.

If, by contrast, as in FIG. 7, the blocking bolt 58 is moved in the direction R by igniting a pyroelectric propellant charge situated in the chamber 68, the blocking bolt 58 is then arranged outside the inner casing tube 31 or the opening 67, with the result that the relative movement between the inner casing tube 31 and the outer casing unit 33 on which the pyroelectric switch 53 is mounted is allowed in the crash situation by corresponding activation of the pyroelectric switch 53, in which case the inner casing tube 31 is then displaced opposite to the direction V, with the deformation rail 52 being pulled in the direction V through the channel 62 of the deformation member 56 for energy absorption.

Figure 8:
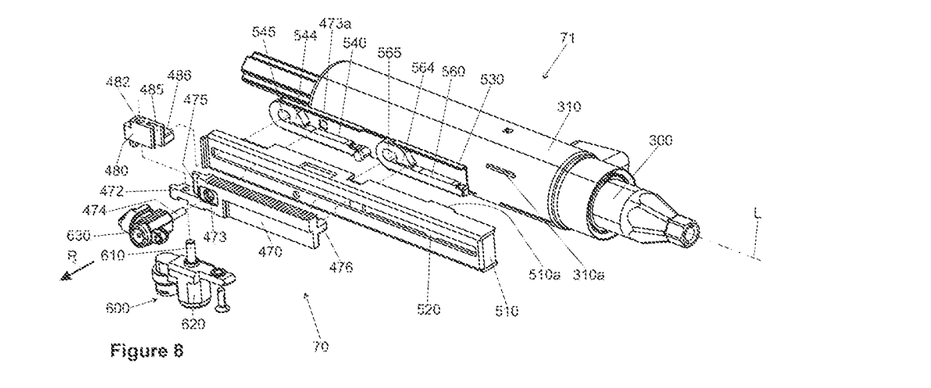
FIG. 8 is an exploded view of the energy absorption device and the inner casing tube of a steering column according to the disclosure.

FIG. 8 depicts a perspective illustration of an energy absorption device 70 according to the invention according to a second embodiment and an inner casing tube 310 and a steering spindle 300 as components of a steering column 71 according to a second preferred embodiment.

The energy absorption device 70 comprises an engagement part 470 which, like the engagement part 54, can be brought into engagement with an arresting device configured analogously to the arresting device 4, with the result that the inner casing tube 310 is arrested with respect to an outer casing unit, that is to say is connected to the arresting device in a form-fitting manner in a fixing position in the longitudinal direction L.

The engagement part 470 has a driver element 476 which is in engagement with a bending element 560 of the energy absorption device 70 in the region of a hook 564 of the bending element 560 and acts as a deformation member in the crash situation. The energy absorption device 70 further comprises a connecting part 480 which, by way of the groove 485, engages or projects into the spring 475, which is designed as a projection, of the engagement part 470. The connecting part 480 has a driver element 486 which is in engagement with a bending element 540 of the energy absorption device 70 in the region of a hook 544 of the bending element 560 and acts as a deformation member in the crash situation.

On the holding profile 510 of the energy absorption device 70 there are mounted the engagement part 470 and the connecting part 480 in such a way that the driver elements 476 and 486 engage through a slot 520 into the engagement openings 545 and 565 of the bending elements 540 and 560. As a result, the engagement part 470, guided in the longitudinal direction parallel to the longitudinal axis L in the slot 520 of the housing 510 designed as a holding profile, can engage via the driver element 476 beyond the hook 564 of the bending element 560 and bend, that is to say plastically deform, the latter in the crash situation. Correspondingly, the connecting part 480, guided in the longitudinal direction parallel to the longitudinal axis L in the slot 520 of the holding profile 510, can engage via the driver element 486 behind the hook 544 of the bending element 540 and bend, that is to say plastically deform, the latter in the crash situation.

In the holding profile 510 there is arranged a C-shaped inner profile 530 of the energy absorption device 70 that extends in the longitudinal direction L and is open outwardly, that is to say toward the holding profile 510. The inner profile 530 can be fixedly connected to the inner casing tube 310, for example by welding, and can be formed from spring steel sheet. In the inner profile 530, as viewed in the longitudinal direction, the bending elements 540 and 560 are arranged with respect to one another with a spacing in the longitudinal direction. Here, the holding profile 510 is fixedly connected to the inner casing tube 310, for example by means of laser welding, by means of form-fitting elements 510a which engage into corresponding receiving openings 310a in the inner casing tube 310.

The energy absorption device 70 further comprises a coupling device 600. The coupling device 600 comprises a pin-shaped coupling element 610 which is mounted on a pyroelectric switch 620. Upon triggering or actuation of the pyroelectric switch 620, a pyroelectric propellant charge is ignited by means of which the coupling element 610 is moved in its axial direction in the direction of the actuator 620, that is to say in the downward direction in FIG. 8.

The pyroelectric switch 620 is fastened to the engagement part 470, with the coupling element 610 passing through a form-fitting opening 472 running transversely with respect to the longitudinal axis L and also through a form-fitting opening 482 formed coaxially thereto in the connecting part 480. There is thus realized the coupled state, which is also referred to as connected state, in which the engagement part 470 is connected to the connecting part 480 in the longitudinal direction by the coupling device 600. Upon an introduction of force via an arresting part (not shown here) in the crash situation, the engagement part 470 and the connecting part 480 are thus moved jointly in the longitudinal direction, with the result that both bending elements 540 and 560 are plastically deformed by a corresponding movement of the driver elements 476 and 486 for energy absorption. If, by contrast, the pyroelectric switch 620 is actuated, only the driver element 476 or the engagement part 470 is moved in the longitudinal direction without the connecting part 480, resulting in only a plastic deformation in the bending element 560.

The execution of the described relative movement is blocked, both in the coupled-in and in the coupled-out state of the connecting part 482, by the blocking bolt 474 of the energy absorption device 70, that is to say in the normal operating state of the steering column when the blocking bolt 474, analogously to the energy absorption device 5 and the steering column 1 according to the first embodiment, engages into an opening 473 of the engagement part 473 and at least one opening 473a of the inner profile 530. If the pyroelectric switch 630 is actuated analogously to the pyroelectric switch 53 according to the first embodiment of the energy absorption device 5 according to the invention, the blocking bolt 474 is moved in the direction R in dependence on a crash situation and/or the ignition of an airbag, with the result that the relative movement between the inner casing tube 310 with respect to the outer casing unit, the engagement part 470 and, depending on the position of the coupling element 610, the connecting part 480 is allowed and hence the energy absorption, which can be selectively set by the coupling device 600, is activated via the bending elements 540 and 560.

Figure 9:
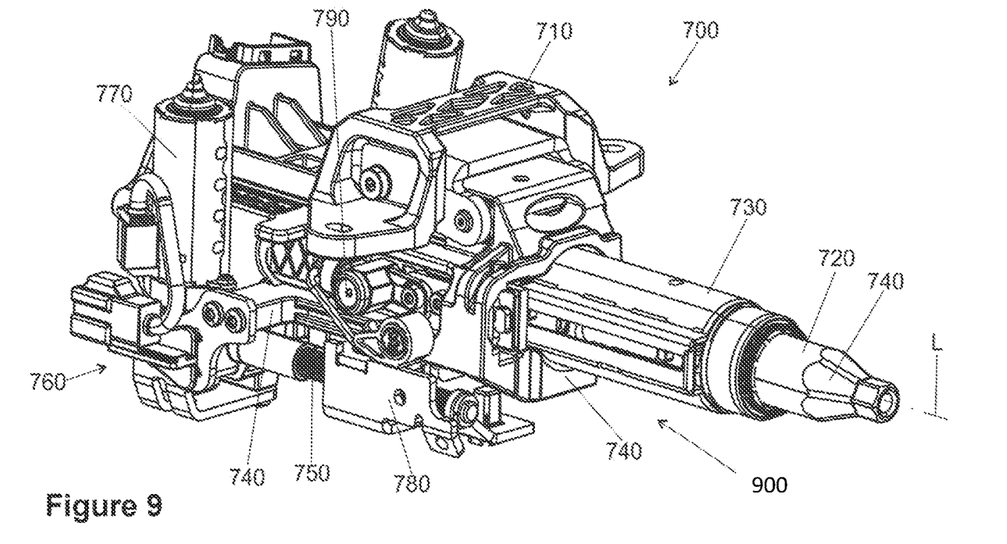
FIG. 9 is a perspective view of the steering column according to the disclosure with a motor-driven adjusting unit.
Figure 10:
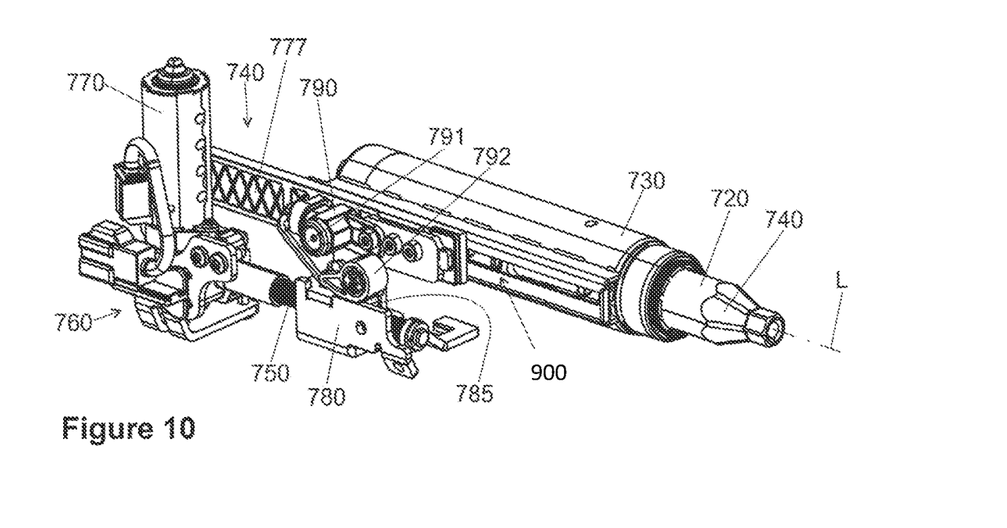
FIG. 10 is a perspective view of the steering column from FIG. 9 without outer casing unit and bracket.

FIG. 9 schematically illustrates a steering column 700 according to the invention in a perspective view obliquely from the rear (with respect to the direction of travel of a motor vehicle, which is not shown). The steering column 700 can be fastened to the body of a motor vehicle (not shown) by means of a bracket 710. A steering spindle 720 is mounted in an inner casing tube 730 so as to be rotatable about the longitudinal axis L, wherein a steering wheel (not shown) can be fitted to the steering spindle 720 at the rear end 740. The inner casing tube 730 is arranged in a receptacle of an outer casing unit 740, said receptacle being continuous in the longitudinal direction, and can be retracted and extended in a telescopic manner in the longitudinal direction L. As is clear from the illustration in FIG. 10 with bracket 710 and outer casing unit 740, the outer casing unit 740 comprises an electric motor actuating drive 760 for carrying out this axial adjustment movement. This drive comprises a spindle 750, which is arranged parallel to the longitudinal axis L and is connected at one end via a holder 780 to the engagement part 777 and thus to the inner casing tube 730 in a rotationally fixed manner, and an electric motor 770. A rotary movement generated by the electric motor 770 is transmitted via a gear mechanism (not shown in further detail here) of the actuating drive 740 to the spindle 750, which is in engagement with a spindle nut, wherein the spindle nut is received in the holder 780 in a rotationally fixed manner. The rotation of the spindle 750 causes the spindle nut 785 and thus the holder 780 and the inner casing tube 730 to be displaced translationally in the direction of the longitudinal axis L.

The steering column 700 further comprises an energy absorption device 900 which is configured analogously to the energy absorption device 70 from FIG. 8 and is accordingly operatively connected to the inner casing tube 730 analogously to the inner casing tube 310. That is to say that actuation of a pyroelectric switch 790 of the energy absorption device 900 causes a blocking bolt (not shown in more detail here) to be moved into a release position, with the result that, in the event of a crash, the inner casing tube 730 is moved, parallel to the longitudinal direction L, relative to the engagement part 777 and the outer casing unit 740 with energy absorption by means of bending elements which are not shown in further detail here but which can be configured like those of FIG. 8 and are in engagement with the engagement part 777. By contrast, in a blocking position, the blocking bolt (not shown here) engages into an opening (not shown here) of the inner casing tube 730, with the result that, under axial loading during the axial adjustment, the relative movement is blocked by the blocking bolt. The pyroelectric switch 790 is connected via a cable 791 to a plug 792 for electrical contact-making.

What is claimed is:

1. An energy absorption device for a steering column for a motor vehicle, comprising:
   an energy absorption element configured to absorb energy by plastically deforming upon a relative movement between at least two components of the steering column in a crash situation,
   a deformation member configured to deform the energy absorption element by plastic deformation, and
   an arresting element configured, in a blocking position, to block the relative movement,
   wherein the arresting element is movable from the blocking position into a release position to allow the relative movement.

2. The energy absorption device of claim 1 wherein, in the blocking position, the arresting element has a blocking structure and, in the release position, a release structure, wherein the release structure and the blocking structure are identical in structure.

3. The energy absorption device of claim 1 further comprising a drive configured to move the arresting element from the blocking position into the release position.

4. The energy absorption device of claim 3 wherein the drive comprises a pyroelectric propellant charge.

5. The energy absorption device of claim 3 wherein the drive is configured to move the arresting element responsive to a crash situation and/or on an event correlating with the crash situation.

6. A steering column for a motor vehicle, comprising:
   a steering spindle,
   an inner casing tube in which the steering spindle is rotatably mounted,
   an outer casing unit configured to hold the inner casing tube, and
   at least one energy absorption device according to claim 1,
   wherein a first of the at least two components comprises the outer casing unit, and the second of the at least two components comprises the inner casing tube,
   wherein the energy absorption device is operatively connected to the outer casing unit, and is operatively connected to the inner casing tube.

7. The energy absorption device of claim 1 wherein the energy absorption element is a deformation rail that is configured to be fastened to an inner casing tube of the steering column.

8. The energy absorption device of claim 7 wherein the deformation member engages the deformation rail.

9. The energy absorption device of claim 1 wherein the energy absorption element is a deformation rail, wherein a deformation member straddles the deformation rail, wherein the deformation rail and the deformation member are configured such that in a crash situation relative movement between the deformation member and the deformation rail causes the deformation member to plastically deform the deformation rail.

10. The energy absorption device of claim 9 wherein the deformation member comprises bulges that oppose one another, wherein the bulges are in direct contact with opposite sides of the deformation rail that the deformation member straddles.

11. The energy absorption device of claim 9 wherein the deformation member comprises two pairs of bulges, each pair opposing one another, wherein the pairs of bulges are in direct contact with opposite sides of the deformation rail that the deformation member straddles.

12. The energy absorption device of claim 1 wherein the arresting element is a blocking bolt that blocks movement of the deformation member relative to the energy absorption element in the blocking position.

13. The energy absorption device of claim 1 wherein the arresting element is a blocking bolt that in the blocking position extends through or into an opening in the deformation member and an opening in the energy absorption element to prevent movement of the deformation member relative to the energy absorption element.

14. The energy absorption device of claim 13 wherein the blocking bolt is configured to remain in the opening of the deformation member in the release position.

15. The energy absorption device of claim 1 wherein in both the blocking position and the release position, the arresting element is configured not to deform the energy absorption element.

16. The energy absorption device of claim 1 wherein the energy absorption element comprises two bending elements that are aligned one behind another along an axis that is parallel to a longitudinal axis of the steering column.

\* \* \* \* \*